United States Patent
Simitsis et al.

(10) Patent No.: US 9,304,829 B2
(45) Date of Patent: Apr. 5, 2016

(54) DETERMINING AND RANKING DISTRIBUTIONS OF OPERATIONS ACROSS EXECUTION ENVIRONMENTS

(71) Applicant: Hewlett-Packard Development Company, L.P., Houston, TX (US)

(72) Inventors: Alkiviadis Simitsis, Santa Clara, CA (US); William K. Wilkinson, San Mateo, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 399 days.

(21) Appl. No.: 13/753,686

(22) Filed: Jan. 30, 2013

(65) Prior Publication Data
US 2014/0215473 A1    Jul. 31, 2014

(51) Int. Cl.
*G06F 9/46*    (2006.01)
*G06F 9/50*    (2006.01)

(52) U.S. Cl.
CPC ........ *G06F 9/5083* (2013.01); *G06F 2209/501* (2013.01)

(58) Field of Classification Search
CPC ..... G06F 9/505; G06F 9/5044; G06F 9/5038; G06F 9/5083
See application file for complete search history.

(56) References Cited

U.S. PATENT DOCUMENTS

| | | | |
|---|---|---|---|
| 7,512,627 B2 | 3/2009 | Hossfeld et al. | |
| 7,565,304 B2* | 7/2009 | Casati et al. | 705/7.27 |
| 7,958,507 B2* | 6/2011 | Santos et al. | 718/102 |
| 8,015,564 B1* | 9/2011 | Beyer et al. | 718/100 |
| 2002/0029207 A1 | 3/2002 | Bakalash et al. | |
| 2005/0188108 A1* | 8/2005 | Carter et al. | 709/239 |

OTHER PUBLICATIONS

Optimizer, Execution Engine & Workload Management, Vertica, An HP Company, 2012, pp. 1-4, Available at: <vertica.com/the-analytics-platform/vertica-optimizer-execution-engine-workload-management/>.
Oracle Business Intelligence Foundation Suite, Technical Overview, Jan. 2011, pp. 1-56, Oracle, Available at: <oracle.com/us/obiee-11g-technical-overview-078853.pdf>.

* cited by examiner

*Primary Examiner* — Wissam Rashid
(74) *Attorney, Agent, or Firm* — Hewlett Packard Enterprise Patent Department

(57) ABSTRACT

Disclosed herein are techniques for managing operations. A distribution of operations across a plurality of execution environments is determined in order to achieve a performance objective. Another distribution of the operations is determined, if the status of the execution environments renders the distribution suboptimal or incapable of achieving the performance objective.

12 Claims, 5 Drawing Sheets

300

| ID | COST | SIZE | RPs | PAR | SCORE | BEST-FOR |
|---|---|---|---|---|---|---|
| 441 | 2295660 | 29 | 0 | 4 | 577 | performance (pdb-n) |
| 512 | 2295935 | 32 | 2 | 2 | 592 | performance (pdb-d) |
| 624 | 2303204 | 38 | 0 | 4 | 603 | performance (mr) |
| 13 | 2350115 | 21 | 0 | 0 | 661 | maintainability |
| 1779 | 3743899 | 52 | 15 | 2 | 1332 | recoverability (hard) |
| 951 | 2295890 | 32 | 3 | 1 | 484 | recoverability (soft) |
| 348 | 2350669 | 27 | 6 | 0 | 433 | globally optimal |
| 233 | 2296219 | 35 | 6 | 1 | 439 | optimal in all but maintainability |

302  304  306  308  310  312  316

| ID 302 | COST 304 | SIZE 306 | RPs 308 | PAR 310 | SCORE 312 | BEST-FOR 316 |
|---|---|---|---|---|---|---|
| 441 | 2295660 | 29 | 0 | 4 | 577 | performance (pdb-n) |
| 512 | 2295935 | 32 | 2 | 2 | 592 | performance (pdb-d) |
| 624 | 2303204 | 38 | 0 | 4 | 603 | performance (mr) |
| 13 | 2350115 | 21 | 0 | 0 | 661 | maintainability |
| 1779 | 3743899 | 52 | 15 | 2 | 1332 | recoverability (hard) |
| 951 | 2295890 | 32 | 3 | 1 | 484 | recoverability (soft) |
| 348 | 2350669 | 27 | 6 | 0 | 433 | globally optimal |
| 233 | 2296219 | 35 | 6 | 1 | 439 | optimal in all but maintainability |

DETERMINING AND RANKING DISTRIBUTIONS OF OPERATIONS ACROSS EXECUTION ENVIRONMENTS

BACKGROUND

Many organizations maintain heterogeneous systems of information technology infrastructure comprising assorted data formats originating from multiple sources. An organization may use a data warehouse to manage structured data and a map-reduce engine to manage semi-structured or unstructured data. Tools may be provided to extract, transform, and load data ("ETL tools"). Some ETL tools permit a user to specify a series of operations that process data from multiple sources or to perform other functions.

BRIEF DESCRIPTION OF THE DRAWINGS

FIG. 3 shows an example table containing data associated with distributions of operations across execution environments.

DETAILED DESCRIPTION

As noted above, ETL tools allow users to specify a series of operations that process data from various sources. Each operation in the series may be carried out in a different execution environment specified by a user. Furthermore, the input for each operation may include the output of a proceeding operation in the series. Since users may not have enough information to determine an optimal distribution, many ETL tools may preempt selections made by a user, if it determines that a more optimal distribution exists. However, such a distribution may be based on a presumed status of the execution environments. The actual or real-time status of the execution environments may have changed since the distribution was determined. Thus, a distribution deemed optimal for achieving a performance objective may be no longer given the real-time status of the environments.

In view of the foregoing, disclosed herein are a system, non-transitory computer readable medium and method for managing a series of operations. In one example, a distribution of operations across a plurality of execution environments may be determined in order to achieve a performance objective. In another example, a different distribution of the operations may be determined, if the status of the execution environments renders the distribution suboptimal or incapable of achieving the performance objective. Thus, rather than having a fixed distribution deemed optimal based on outdated information, the distribution may be adjusted in accordance with real-time information. The aspects, features and advantages of the present disclosure will be appreciated when considered with reference to the following description of examples and accompanying figures. The following description does not limit the application; rather, the scope of the disclosure is defined by the appended claims and equivalents.

Figure 1:
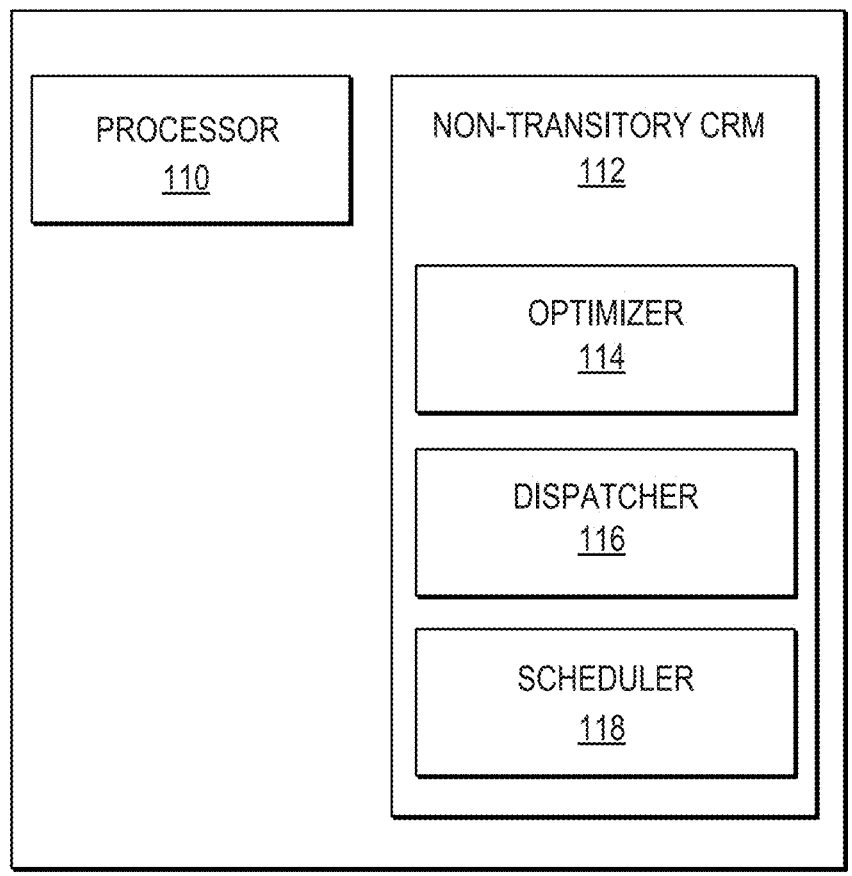
FIG. 1 is a block diagram of an example system in accordance with aspects of the present disclosure.

FIG. 1 presents a schematic diagram of an illustrative computer apparatus 100 for executing the techniques disclosed herein. The computer apparatus 100 may include all the components normally used in connection with a computer. For example, it may have a keyboard and mouse and/or various other types of input devices such as pen-inputs, joysticks, buttons, touch screens, etc., as well as a display, which could include, for instance, a CRT, LCD, plasma screen monitor, TV, projector, etc. Computer apparatus 100 may also comprise a network interface (not shown) to communicate with other devices over a network.

The computer apparatus 100 may also contain a processor 110, which may be any number of well known processors, such as processors from Intel® Corporation. In another example, processor 110 may be an application specific integrated circuit ("ASIC"). Non-transitory computer readable medium ("CRM") 112 may store instructions that may be retrieved and executed by processor 110. As will be discussed further below, the instructions may include an optimizer 114, a dispatcher 116, and a scheduler 118.

In one example, non-transitory CRM 112 may be used by or in connection with any instruction execution system that can fetch or obtain the logic from non-transitory CRM 112 and execute the instructions contained therein. Non-transitory computer readable media may comprise any combination of the following physical tangible non-transitory media: non-transitory electronic media, non-transitory magnetic media, non-transitory optical media, non-transitory electromagnetic media, or non-transitory semiconductor media. More specific examples of suitable non-transitory computer-readable media include, but are not limited to, a portable magnetic computer diskette such as floppy diskettes or hard drives, a read-only memory ("ROM"), an erasable programmable read-only memory, a portable compact disc or other storage devices that may be coupled to computer apparatus 100 directly or indirectly. Alternatively, non-transitory CRM 112 may be a random access memory ("RAM") device or may be divided into multiple memory segments organized as dual in-line memory modules ("DIMMs"). The non-transitory CRM 112 may also include any combination of one or more of the foregoing and/or other devices as well. While only one processor and one non-transitory CRM are shown in FIG. 1, computer apparatus 100 may actually comprise additional processors and memories that may or may not be stored within the same physical housing or location.

The instructions residing in non-transitory CRM 112 may comprise any set of instructions to be executed directly (such as machine code) or indirectly (such as scripts) by processor 110. In this regard, the terms "instructions," "scripts," and "applications" may be used interchangeably herein. The computer executable instructions may be stored in any computer language or format, such as in object code or modules of source code. Furthermore, it is understood that the instructions may be implemented in the form of hardware, software, or a combination of hardware and software and that the examples herein are merely illustrative.

The instructions in optimizer 114 may cause processor 110 to determine a distribution of successive operations among a plurality of execution environments based on a presumed status of the execution environments; the distribution may be determined so as to achieve a performance objective. Optimizer 114 may also determine at least one alternative distribution of the successive operations. The alternative distributions may be used when the actual status of the environments is different than what was previously assumed. Each alternative distribution may be determined in accordance with the performance objective.

The instructions in scheduler 118 may instruct processor 110 to determine whether an actual status of the execution environments renders the distribution suboptimal for achieving the performance objective. Scheduler 118 may also request an alternative distribution, if the actual status renders the distribution suboptimal. The actual status of the environments may include the current workload of an execution environment. In another example, the actual status may indicate whether the environment is active. Accordingly, the alternative distribution may be deemed optimal for achieving the performance objective in view of the real or actual status of the execution environments.

The instructions of dispatcher 116 may instruct processor 110 to ensure the successive operations are executed in a predetermined order. As will be discussed further below, optimizer 114 may place a first subset and a second subset of the operations on a queue. Dispatcher 116 may ensure that the first subset and the second subset execute in the order determined by a user.

Figure 2:
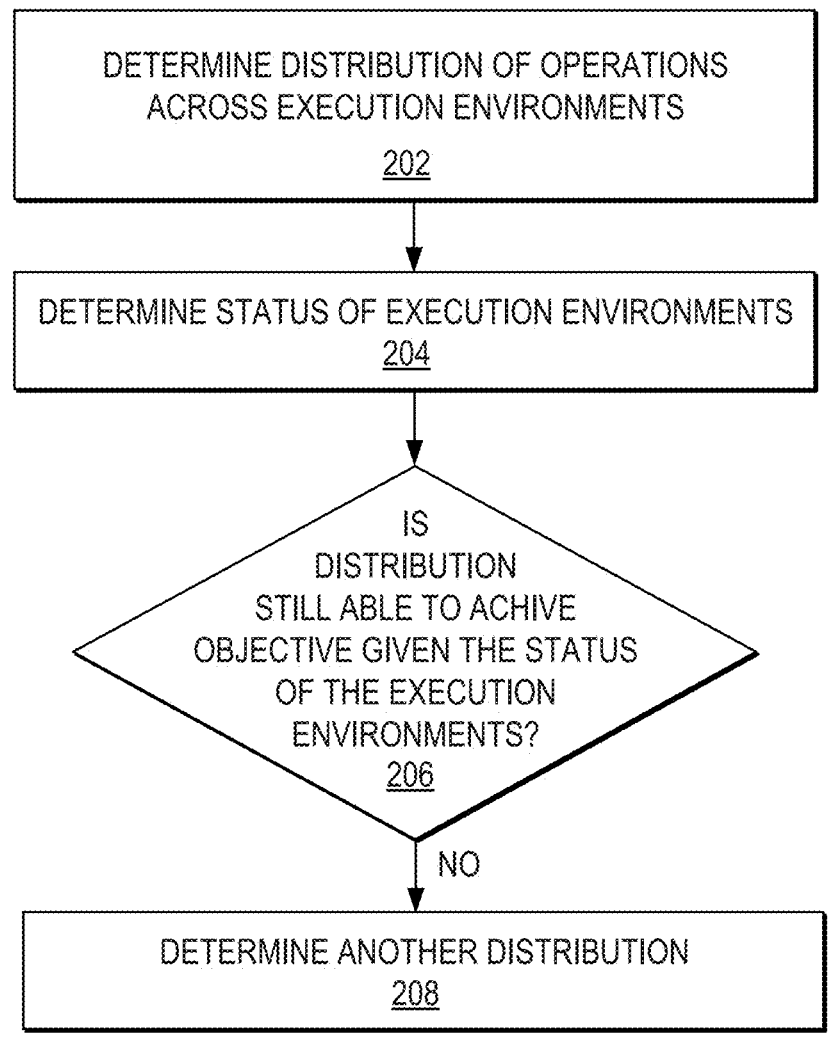
FIG. 2 is a flow diagram of an example method in accordance with aspects of the present disclosure.
Figure 4:
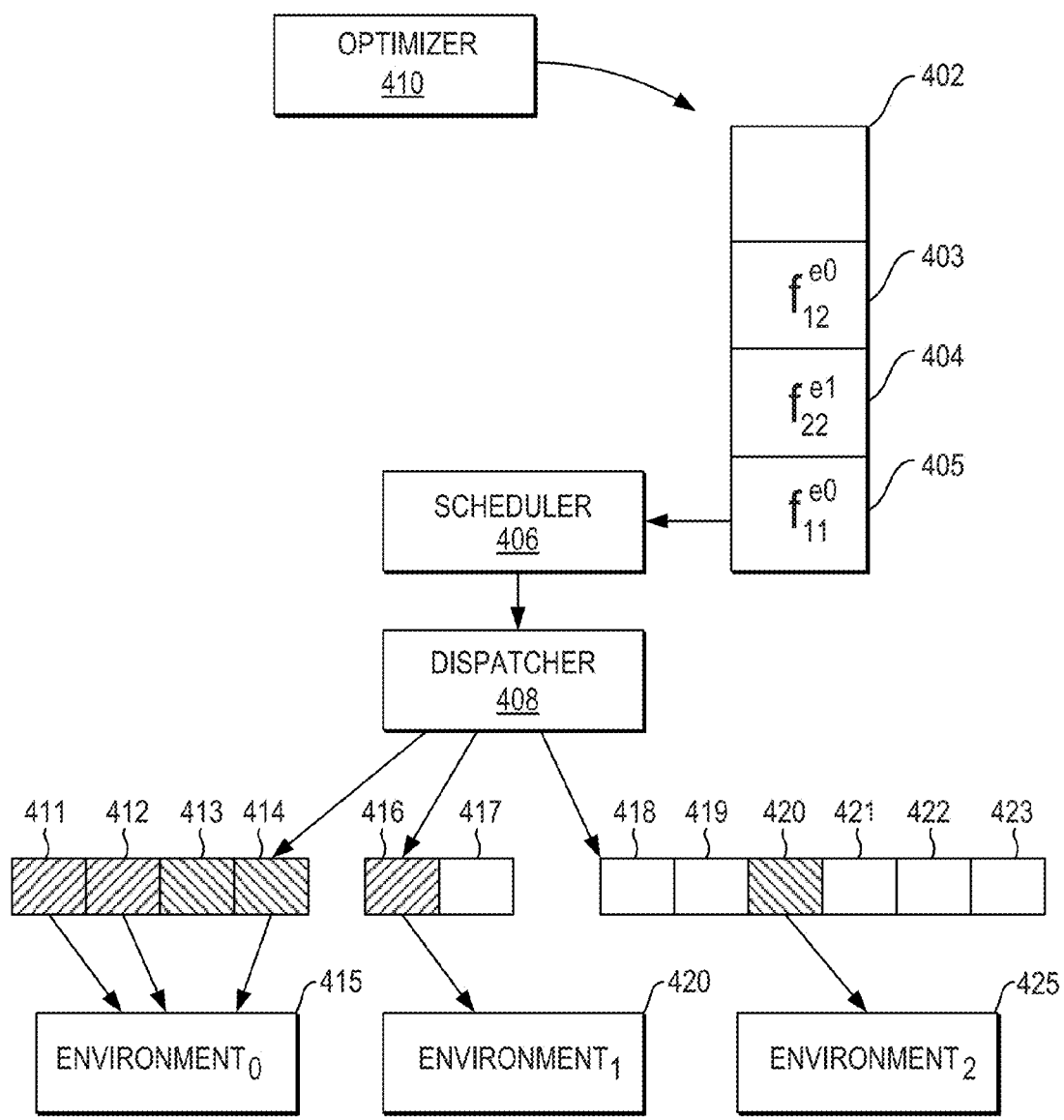
FIG. 4 is a working example in accordance with aspects of the present disclosure.

Working examples of the system, method, and non-transitory computer-readable medium are shown in FIGS. 2-5. In particular, FIG. 2 illustrates a flow diagram of an example method 200 for managing operations. FIGS. 3-4 show different aspects of a working example in accordance with the techniques disclosed herein. The actions shown in FIGS. 3-4 will be discussed below with regard to the flow diagram of FIG. 2.

As shown in block 202 of FIG. 2, a distribution of operations across execution environments may be determined; the distribution may be determined such that a performance objective is achieved. A performance objective may include speed, fault tolerance, or a combination of objectives. In one example, optimizer 114 may resolve trade-offs to satisfy conflicting objectives by formulating the problem as a maximum vector problem ("skyline computation"). In this instance, optimizer 114 maximizes a monotone scoring function representing an optimization objective. In a further example, as optimizer 114 determines solutions for multiple objectives, it may identify a number of states, each of which optimizes an objective. Each state may be stored as a distribution across the execution environments.

By way of example, a parallel database engine and a map-reduce engine may be candidate execution environments. Based on the characteristics of the operations, the cost model, and the objectives, optimizer 114 may determine that the parallel database engine is the best choice for executing a given series of operations. In another example, optimizer 114 may determine that the parallel database has the best potential for achieving the objective. However, the determination by optimizer 114 may be based on a presumed status of the parallel database engine. In real-time, the parallel database engine may be under a heavy workload such that it can no longer accept further operations; furthermore, the parallel database may no longer be active. For example, the parallel database engine may have been retired or replaced.

Different example distributions are listed in table 300 of FIG. 3. Each row in this illustrative table represents a different distribution that may employ different execution environments. In table 300, identifier column 302 may contain an identifier for each distribution; cost column 304 may represent a total cost for using that distribution over its execution environments; size column 306 may indicate a number of operations that may be executed by the distribution; recovery point column 308 may contain a number of recovery point operations configured in the distribution; and, parallelization column 310 may indicate the degree of parallelization of operations in the distribution. While a distribution with a higher number of recovery points may be associated with slower performance, such a distribution may better achieve an objective of fault tolerance. Conversely, a distribution with a higher parallelization value may better achieve an objective of faster performance, however such a distribution may not protect well against system failures. Table 300 may further include a score column 312 that may contain a weighted aggregate of all objectives; best-for column 316 may indicate the objective that the distribution is optimal for achieving. Table 300 may be generated by optimizer 114 and analyzed in view of the objective sought out by a user. By way of example, distribution 441 may be optimal for performance. However, while distribution 951 has a slightly higher cost, it offers better fault tolerance.

Referring back to FIG. 2, the actual or real-time status of the execution environments may be determined, as shown in block 204. As noted above, optimizer 114 may determine a distribution based on a presumed status of the execution environments. As such, it may be further determined whether the distribution is still able to achieve the objective given the actual status of the execution environments, as shown in block 206. That is, it may be determined whether the difference between the presumed status and the actual status of the environments renders the distribution suboptimal for achieving the objective.

Referring now to FIG. 4, optimizer 410 may place a series of operations f on queue 402. Scheduler 406 may dequeue a series from the queue and may attempt to schedule it for execution in the environment specified by optimizer 410. In the illustrative system of FIG. 4, there may be three execution environments available, environments 415, 420, and 425. Each environment may have a number of slots available for executing jobs, where a job corresponds to a particular series of operations in queue 402. That is, the number of slots corresponds to the maximum number of concurrently executing jobs on an execution environment. Environment 415 is shown having fours slots 411-414; the shaded slots represent occupied slots. Environment 420 is shown having only two slots 416 and 417, one of which is available. Environment 425 is shown having six slots 418-423, one of which is occupied. In the example of FIG. 4, a multi programming limit ("MPL") algorithm may be used for scheduling the operations.

Queue 402 shows three series of operations waiting to be executed. Regarding series 403, the superscript "e0" may indicate that the series is designated for environment 0 (i.e., environment 415); the subscript "12" may indicate that the series is a second subset of a larger series "1." Regarding series 403, the superscript "e1" of series 404 may indicate that the series is designated for execution in environment 1 (i.e., environment 420); the subscript "22" may indicate that the series is a second subset of a larger series "2." With regard to series 405, the superscript "e0" may indicate that the series is designated for environment 0 (i.e., environment 415); the subscript "12" may indicate that the series is a second subset of a larger series "1." In this example, the output of series 405 is the input for series 403. Thus, dispatcher 408 may ensure that the first subset and the second subset execute in order. Furthermore, it is understood that a series of operations may be divided into multiple subsets. Each subset may include at least one operation.

When attempting to schedule the first subset of series one (i.e., series 405), scheduler 406 will determine that environment 0 is temporarily unavailable (i.e., all its slots are occupied by executing jobs). Rather than waiting for a job to finish such that a slot becomes available, scheduler 406 may request optimizer 410 to provide an alternative distribution for the entire series, including operations from the second subset shown in series 405. Optimizer 410 may then provide an alternative distribution in view of the real-time status of the computing environments. Optimizer 410 may weigh the different strengths and weaknesses of each candidate environment by analyzing data similar to that of table 300 of FIG. 3. For example, in FIG. 4, the optimizer can rank each alternative distribution in accordance with a potential thereof to meet the performance objective given the actual status, and may choose an alternative distribution for series 403 and series 405, which are both subsets of a larger series "1," such that all operations thereof are assigned to environment 420 or environment 425; both environment 420 and environment 425 have open slots.

Figure 5:
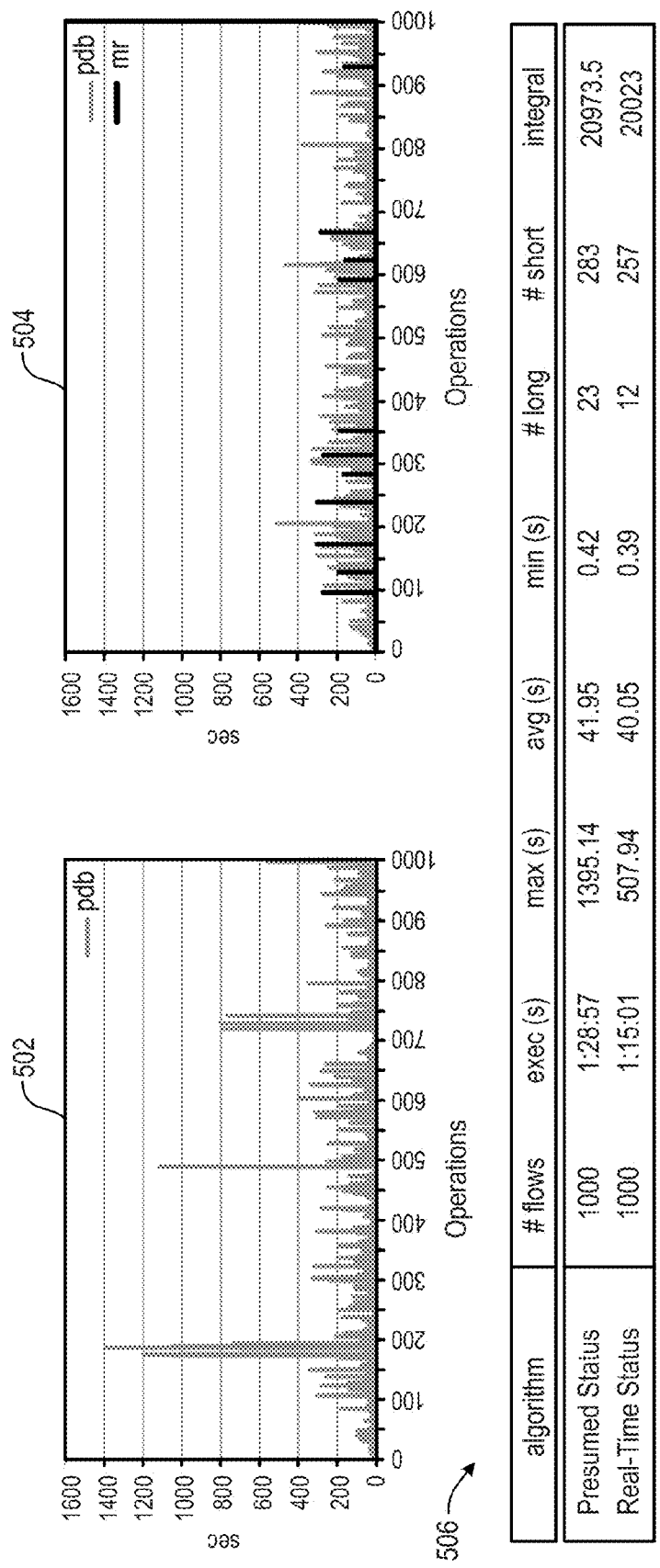
FIG. 5 shows example charts demonstrating the advantages of the techniques disclosed in the present disclosure.

FIG. 5 shows graphs that demonstrate the advantages of the techniques disclosed herein. Each point along the vertical axis of graphs 502 and 504 indicates execution time in seconds; each point along the horizontal axis of the graphs indicates a distribution being executed. Graph 502 demonstrates the performance of 1000 distributions being executed using the presumed status of the execution environments. That is, graph 502 demonstrates the execution time of distributions that were not adjusted in view of the actual status of the execution environments. Several spikes in time can be seen in graph 502 that go beyond 600 seconds. However, as shown in graph 504, when the same distributions are altered using the techniques disclosed above, the execution times are shorter (i.e., the spikes are much shorter) and a smoother graph results. The table 506 shows statistics for the presumed status approach and the real-time status approach in accordance with aspects of the present disclosure. The techniques disclosed in the present specification completed about 14 minutes faster than the presumed status technique. In this particular example, some distributions were altered to execute on a different execution environment, (e.g., from a parallel database environment, pdb, to map-reduce environment, mr).

Advantageously, the foregoing system, method, and non-transitory computer readable medium adjust distributions that were deemed optimal based on outdated information so that the distribution reflects real time information. A change in the execution environment could hinder the performance objective of the operations. Instead of executing an entire process based on limited knowledge, more efficient arrangements may be determined automatically. Since data center infrastructure undergoes periodic changes (e.g., software upgrades, replacement of compute racks, introduction and retirement of applications, etc.) the automatic adjustment of distributions ensures that an optimal distribution will be arranged despite such changes.

Although the disclosure herein has been described with reference to particular examples, it is to be understood that these examples are merely illustrative of the principles of the disclosure. It is therefore to be understood that numerous modifications may be made to the examples and that other arrangements may be devised without departing from the spirit and scope of the disclosure as defined by the appended claims. Furthermore, while particular processes are shown in a specific order in the appended drawings, such processes are not limited to any particular order unless such order is expressly set forth herein; rather, processes may be performed in a different order or concurrently and steps may be added or omitted.

The invention claimed is:

1. A system comprising:
   at least one processor;
   an optimizer executable by the at least one processor to determine a first distribution of successive operations among a plurality of execution environments based on a presumed status of the execution environments so as to achieve a performance objective;
   a scheduler executable by the at least one processor to:
      determine whether an actual status of the execution environments renders the first distribution suboptimal for achieving the performance objective, and
   request alternative distributions in response to determining that the actual status renders the first distribution suboptimal;
   the optimizer executable by the at least one processor to, in response to the request, determine the alternative distributions of the successive operations among the plurality of execution environments, and rank each respective alternative distribution of the alternative distributions in accordance with a potential of the respective alternative distribution to meet the performance objective given the actual status; and
   a dispatcher executable by the at least one processor to ensure the successive operations are executed in a predetermined order.

2. The system of claim 1, wherein the dispatcher is executable by the at least one processor to ensure that a first subset of the operations and a second subset of the operations execute in the predetermined order.

3. The system of claim 1, wherein the actual status comprises a current workload of an execution environment of the execution environments.

4. The system of claim 1, wherein the execution environments comprise a first execution environment including a database engine, and a second execution environment including a map-reduce engine.

5. The system of claim 1, wherein the alternative distributions employ different execution environments.

6. A non-transitory computer readable medium, storing instructions which, upon execution, cause at least one processor to:
   determine a first distribution of successive operations across a plurality of execution environments to achieve a performance objective, the first distribution based on a presumed status of the execution environments;
   determine whether a difference between the presumed status and a real-time status of the execution environments renders the first distribution suboptimal for achieving the performance objective;
   determine alternative distributions of the successive operations across the plurality of execution environments, in response to determining that the difference between the presumed status and the real-time status renders the first distribution suboptimal;
   rank each respective alternative distribution of the alternative distributions in accordance with a potential of the respective alternative distribution to meet the performance objective given the real-time status; and
   schedule the successive operations in a predetermined order.

7. The non-transitory computer readable medium of claim 6, wherein the instructions upon execution cause the at least one processor to ensure that a first subset of the operations and a second subset of the operations execute in the predetermined order.

8. The non-transitory computer readable medium of claim 6, wherein the real-time status comprises a current workload of an execution environment of the execution environments.

9. A method comprising:
   determining, using at least one processor, a distribution of a series of operations across a plurality of execution environments to achieve a performance objective, the distribution being based on a presumed status of the execution environments;

determining, using at least one processor, whether an actual status of the execution environments is different than the presumed status such that the actual status renders the distribution incapable of achieving the performance objective;

determining, using at least one processor, a number of alternative distributions of the series of operations across the plurality of execution environments to achieve the performance objective, when the actual status renders the distribution incapable of achieving the performance objective;

ranking, using at least one processor, each alternative distribution in accordance with a potential thereof to meet the performance objective given the actual status; and scheduling, using at least one processor, each operation in the series of operations in a predetermined order.

10. The method of claim 9, wherein each alternative distribution is optimal for achieving the performance objective in view of the actual status of the execution environments.

11. The method of claim 10, further comprising ensuring, using at least one processor, that a first subset of the operations and a second subset of the operations execute in the predetermined order.

12. The method of claim 11, wherein the actual status comprises a current workload of an execution environment of the execution environments.

* * * * *